(12) United States Patent
Bruegmann (10) Patent No.: US 9,648,965 B2
(45) Date of Patent: May 16, 2017

(54) MODULAR PRODUCT DISPLAY SHELF SYSTEM

(71) Applicant: Bruegmann USA, Inc., Houston, TX (US)

(72) Inventor: Malte Bruegmann, Houston, TX (US)

(73) Assignee: Bruegmann USA, Inc., Houston, TX (US)

(*) Notice: Subject to any disclaimer, the term of this patent is extended or adjusted under 35 U.S.C. 154(b) by 0 days.

(21) Appl. No.: 14/751,186

(22) Filed: Jun. 26, 2015

(65) Prior Publication Data

US 2016/0000238 A1 Jan. 7, 2016

Related U.S. Application Data

(60) Provisional application No. 62/020,018, filed on Jul. 2, 2014.

(51) Int. Cl.
*A47F 5/10* (2006.01)
*A47F 5/13* (2006.01)
*B60B 33/00* (2006.01)

(52) U.S. Cl.
CPC ............. *A47F 5/108* (2013.01); *A47F 5/13* (2013.01); *A47F 5/135* (2013.01); *A47F 5/137* (2013.01); *B60B 33/0002* (2013.01)

(58) Field of Classification Search
CPC ........... A47B 47/008; A47B 47/00016; A47B 47/0058; A47B 47/0083; A47B 47/021; A47B 47/045; A47B 47/024; A47B 57/54; A47B 57/545; A47F 5/00; A47F 5/0018; A47F 5/10; A47F 5/137; A47F 5/108; A47F 5/13; A47F 5/135
USPC .................................................. 211/189, 187
See application file for complete search history.

(56) References Cited

U.S. PATENT DOCUMENTS

| | | | | |
|---|---|---|---|---|
| 3,181,650 A | * | 5/1965 | Cutter | E04H 12/18 182/186.7 |
| 3,533,513 A | * | 10/1970 | Berman | A47F 5/14 211/175 |
| 3,788,242 A | * | 1/1974 | Hassel | A47B 47/024 108/107 |
| 3,912,086 A | * | 10/1975 | de Bruyn | A47F 5/0093 16/88 |
| 4,349,213 A | * | 9/1982 | Hirsch | B62B 1/00 126/283 |
| 4,433,788 A | * | 2/1984 | Erlam | H02B 1/30 211/189 |
| 4,788,741 A | * | 12/1988 | Hilborn | B60B 33/0002 16/35 R |
| 4,940,150 A | * | 7/1990 | Spengler | A47B 87/0223 211/133.1 |
| 5,016,765 A | * | 5/1991 | Leonardo | A47B 47/021 211/182 |
| 5,269,112 A | * | 12/1993 | Weinrub | G09F 15/0068 211/189 |

(Continued)

*Primary Examiner* — Patrick Hawn
(74) *Attorney, Agent, or Firm* — Richard A. Fagin (57) ABSTRACT

A modular product display shelf system includes at least one end support frame comprising two conduits pivotally connected to each other. Each of the two conduits has support conduits affixed at longitudinal ends thereof in a direction transverse to the conduits. At least one vertical support column is disposed in each support conduit. At least one shelf is affixed at a selected longitudinal position to each of the vertical support columns.

12 Claims, 7 Drawing Sheets

(56) References Cited

U.S. PATENT DOCUMENTS

| | | | | |
|---|---|---|---|---|
| 5,330,060 A * | 7/1994 | Bohner | ............... | A47B 31/00 211/41.4 |
| 5,330,064 A * | 7/1994 | Hall | ............... | A47F 5/135 16/29 |
| 5,957,309 A * | 9/1999 | Hall | ............... | A47B 47/021 211/126.2 |
| 5,957,310 A * | 9/1999 | Mitchell | ............... | A47B 43/00 211/149 |
| 6,036,034 A * | 3/2000 | Battaglia | ............... | A47B 57/404 211/187 |
| 6,062,402 A * | 5/2000 | Ford | ............... | A47F 5/137 211/181.1 |
| 6,220,464 B1 * | 4/2001 | Battaglia | ............... | A47B 57/54 108/107 |
| 6,286,694 B1 * | 9/2001 | Battaglia | ............... | A47B 55/02 108/107 |
| 6,311,856 B2 * | 11/2001 | Battaglia | ............... | A47B 57/00 108/107 |
| 6,422,407 B2 * | 7/2002 | Arai | ............... | A47B 45/00 211/175 |
| 6,789,688 B2 * | 9/2004 | Roush | ............... | A47F 5/01 211/201 |
| 8,042,477 B2 * | 10/2011 | Lee | ............... | A47B 57/54 108/109 |
| 8,079,313 B2 * | 12/2011 | Sparkowski | ............... | A47F 5/0018 108/110 |
| 8,584,873 B2 * | 11/2013 | Horn | ............... | A47B 47/0083 211/187 |
| 8,833,573 B2 * | 9/2014 | Tomaszewski | ............... | B65D 19/385 108/186 |
| 2001/0004064 A1 * | 6/2001 | Battaglia | ............... | A47B 57/54 211/187 |

* cited by examiner

MODULAR PRODUCT DISPLAY SHELF SYSTEM

CROSS-REFERENCE TO RELATED APPLICATIONS

Priority is claimed from U.S. Provisional Application No. 62/020,018 filed on Jul. 2, 2014.

STATEMENT REGARDING FEDERALLY SPONSORED RESEARCH OR DEVELOPMENT

Not applicable.

NAMES OF THE PARTIES TO A JOINT RESEARCH AGREEMENT

Not Applicable.

BACKGROUND

This disclosure is related to the field of retail product display shelf systems. More specifically, the disclosure relates to modular shelf systems the components for which may be closed to small sizes for shipment.

Modular shelf systems known in the art include rectangular box frames that may be used on both lower and upper ends of upright columns to assemble one or more shelf racks. The shelf racks may be individually assembled or may be interconnected to form a larger, unitized shelf system. Wire racks or similar product support shelves may be disposed within the upright columns at selected positions along the vertical support columns.

The rectangular box frames occupy substantial space such that transportation of such modular shelf systems for later assembly at the place of use may be relatively costly.

BRIEF DESCRIPTION OF THE DRAWINGS

FIGS. 11 and 12 show the locking mechanism of FIGS. 4 and 5 in more detail.

FIGS. 13 and 14 show oblique views of the shelf support frame fully assembled as in FIG. 10 with product shelves supported within vertical support columns. FIG. 13 shows the bare shelf system. FIG. 14 shows the shelf system with product containers disposed thereon.

DETAILED DESCRIPTION

Figure 1:
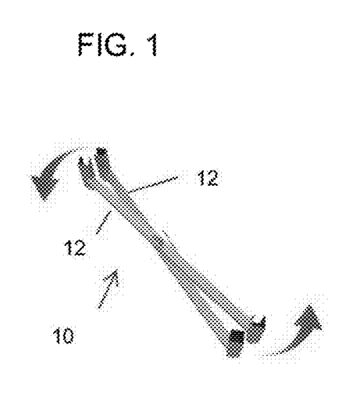
FIGS. 1-3 show respective closed position (FIG. 1) and open position (FIGS. 2 and 3) views of an end support frame for a shelf system according to the present disclosure.

FIG. 1 shows an example embodiment, for a modular product shelf system according to the present disclosure, of an end support frame 10 in a closed position for shipping. The end support frame 10 may be made from two rods 12 each of a selected length connected to each other approximately at the longitudinal centers thereof by a lockable pivot (explained further below with reference to FIGS. 4 and 5). The rods 12 may be equal length or of unequal length depending on the desired shape of an assembled shelf support and/or system thereof. The rods 12 may be tubular, angled, rectangular, square or any other suitable shape resistant to bending. The rods 12 may be hollow cross-section to reduce weight while still having substantial resistance to bending.

Figure 2:
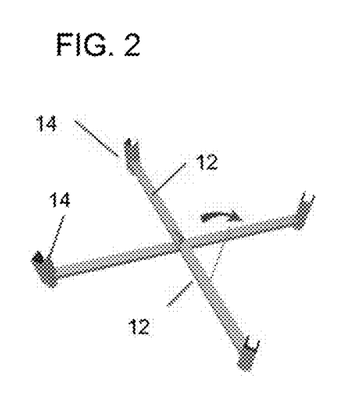

As shown in FIG. 2, the longitudinal ends of the rods 12 may include support conduits 14 affixed thereto. The support conduits 14 may be affixed to the longitudinal ends of the rods 12 substantially perpendicularly to the longitudinal ends of the rods 12 and may be oriented to be vertical when the rods 12 are horizontal. The support conduits 14 may be hollow cross section and may be any selected shape corresponding to an exterior shape of vertical support columns to be inserted therein. Example shapes for the support conduits may include, without limitation, round cylindrical, rectangular cross section and square cross section. The vertical support columns will be explained further with reference to FIGS. 7 through 10.

Figure 3:
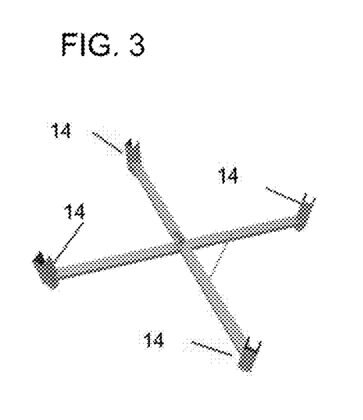
Figure 4:
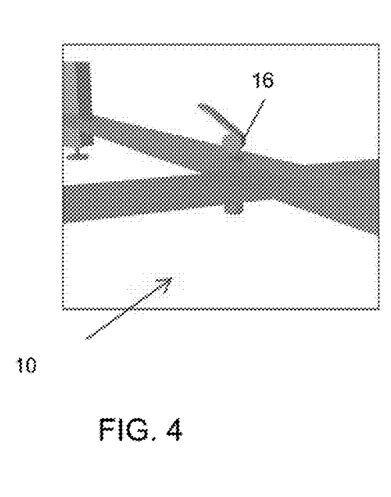
FIGS. 4 and 5 show a locking mechanism that may be used in some embodiments to hold the end support frame in the open or closed position.
Figure 5:
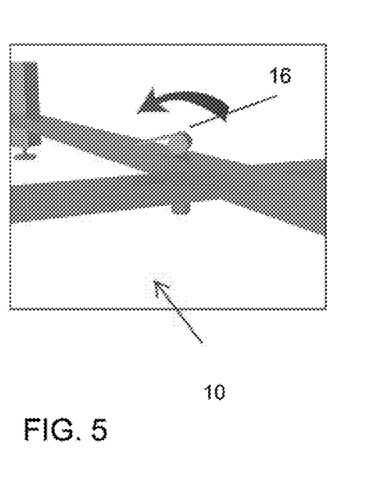

FIGS. 4 and 5 show an example pivot and locking mechanism 16 that may be used in some embodiments. The pivot and locking mechanism 16 enables relative rotation of the rods (12 in FIGS. 1-3) with respect to each other and may be, for example, a type which expands in external diameter when a handle is moved from a released position to a locked position as shown in FIGS. 4 and 5, respectively. When the pivot and locking mechanism 16 is locked, the rods (12 in FIGS. 1, 2 and 3) may be rotationally fixed with respect to each other. Locking may be used when the rods (as shown at 12 in FIG. 1) are in the closed position for transportation so that the rods will not open during transport. Locking may also be used when the rods 12 are in the fully open position (see FIGS. 2 and 3) so that the rods 12 remain in the correct position for assembly of a shelf unit or a shelf system. Although the illustrated embodiment has the rods 12 disposed substantially orthogonal to each other when the end frame is in the open position, in other embodiments, the relative rotational orientation of the rods 12 may be other than orthogonal.

Figure 6:
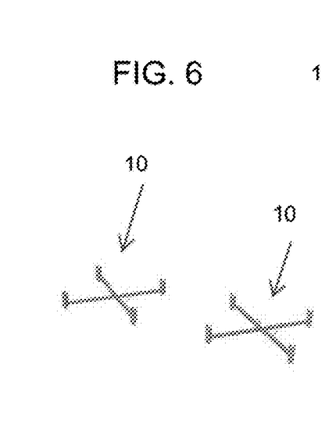
FIGS. 6-10 show an assembly sequence of a shelf support frame using multiple end support frames.
Figure 7:
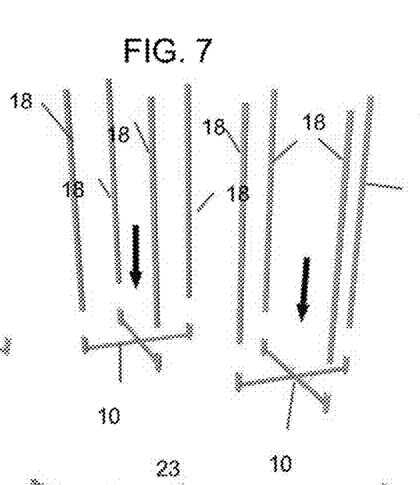

FIGS. 6 through 10 show an assembly sequence for one embodiment of a shelf system according to the present disclosure. In FIG. 6, two end support frames 10 may be disposed at predetermined positions on a floor or other supporting surface. The end support frames 10 are locked in the open position. In FIG. 7, vertical support columns 18 may be inserted into each of the support conduits (14 in FIGS. 2 and 3) in each of the end support frames 10. The foregoing forms two end support frame and vertical support column assemblies ("assemblies").

Figure 8:
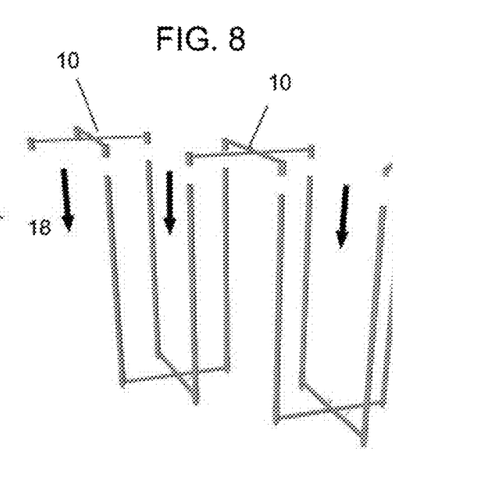

In FIG. 8, two additional end support frames 10 may connect the two end frame and vertical support column assemblies as shown in FIG. 7 by affixing the additional end support frames 10 to the upper ends of the vertical support columns in offsetting ones of each of the assemblies.

Figure 9:
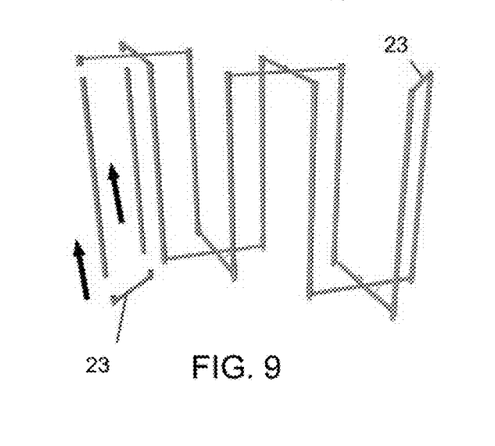

As shown in FIG. 9, the remaining unused support conduits in the outermost end support frame 10 on top may include vertical support columns 18 inserted therein and the bottom of such columns may be connected by an end conduit 23 having features to connect to the support conduits 14 and to connect the features to each other at a same distance as a distance between the support conduits at the ends of each of the two rods 12 in a single end support frame 10.

Figure 10:
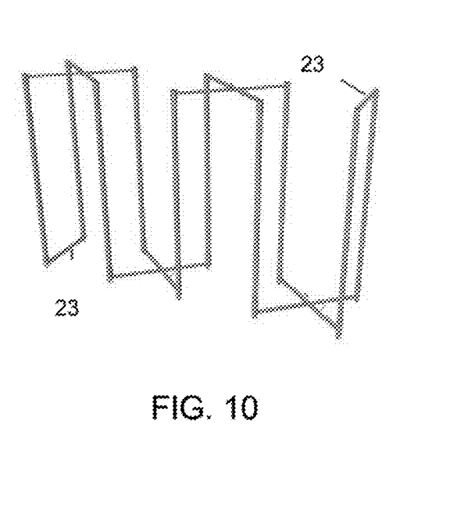

FIG. 10 shows a similar end conduit 23 assembled to vertical support columns 18 for the opposite, bottom located end support frame 10. The assembly in FIG. 10 forms the supporting framework ("shelf support frame") for an embodiment of a shelf system according to the disclosure. It will be apparent to those skilled in the art that additional end support frame(s) 10 may substitute either or both of the end conduits 23 so that the shelf system can be extended beyond the example configuration shown in FIG. 10.

Figures 11, 13:
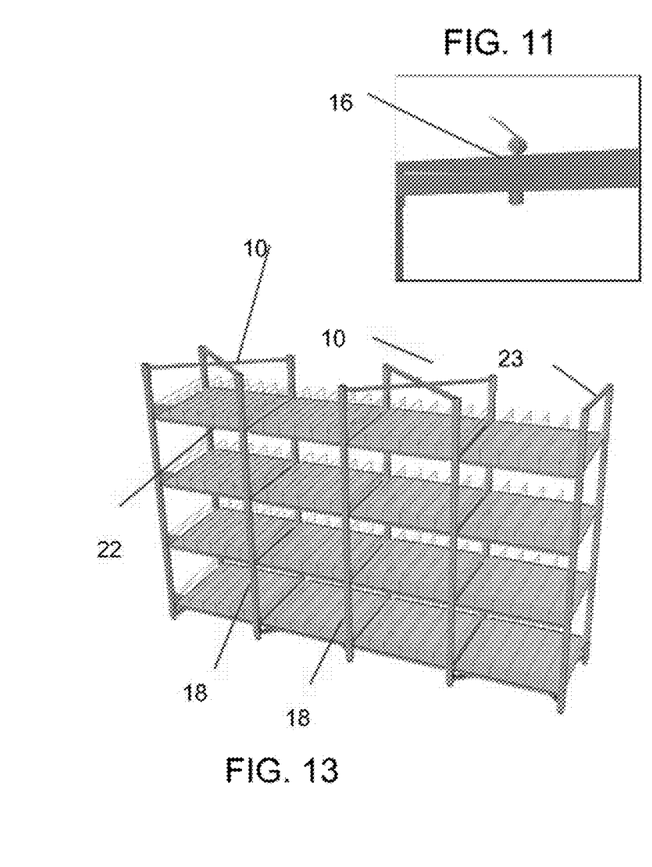
Figure 12:
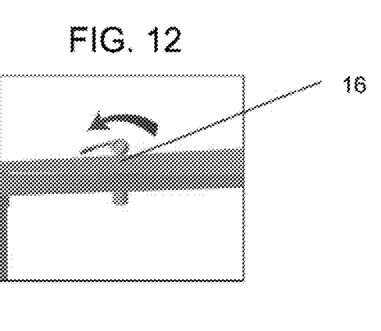

FIGS. 11 and 12 show the locking mechanism 16 of FIGS. 4 and 5 in more detail.

Figure 14:
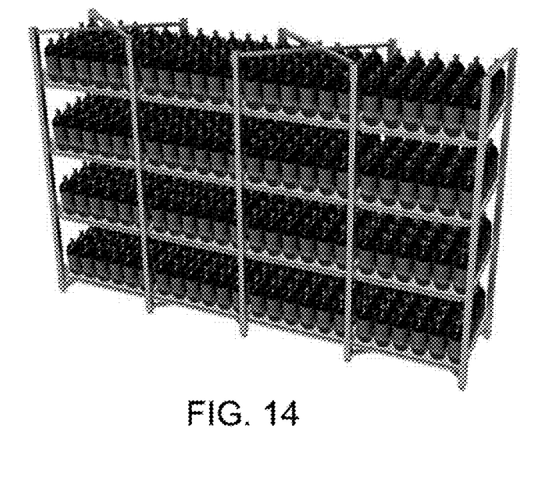

FIGS. 13 and 14 show oblique views of the shelf support frame fully assembled as in FIG. 10 with product shelves supported 22 within the vertical support columns 18. The product shelves 22 may be wire racks, or any other form of product support shelf suitable for the type of product to be stored in the display system. The product shelves 22 may be supported in selected positions along the vertical support columns 18 using any known device for holding an element along a vertical support, including, without limitation, pins inserted into the vertical support columns, clamps affixed to the vertical support columns and detents in the vertical support columns cooperatively engaged with retractable, spring loaded pins in the corners of each shelf 22. FIG. 13 shows the bare shelf system. FIG. 14 shows the shelf system with product containers disposed thereon.

Figure 15:
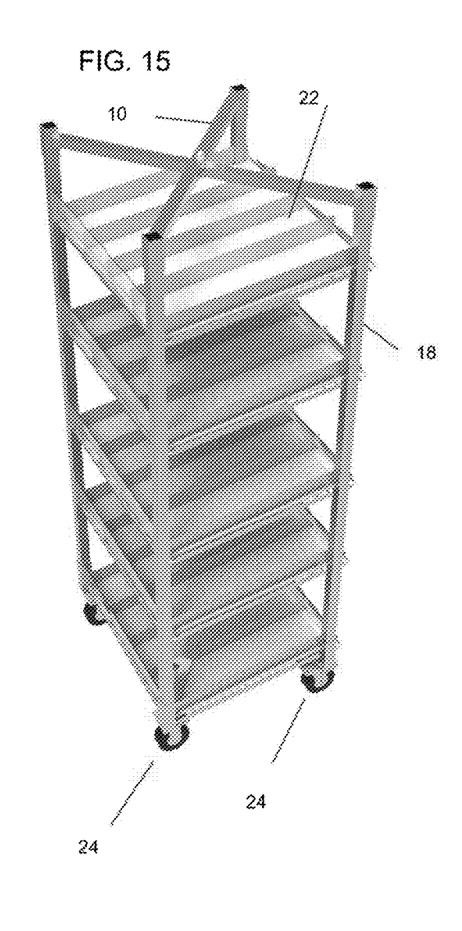
FIGS. 15 and 16 show an individual product shelf support having casters on a bottom thereof to enable movement.
Figure 16:
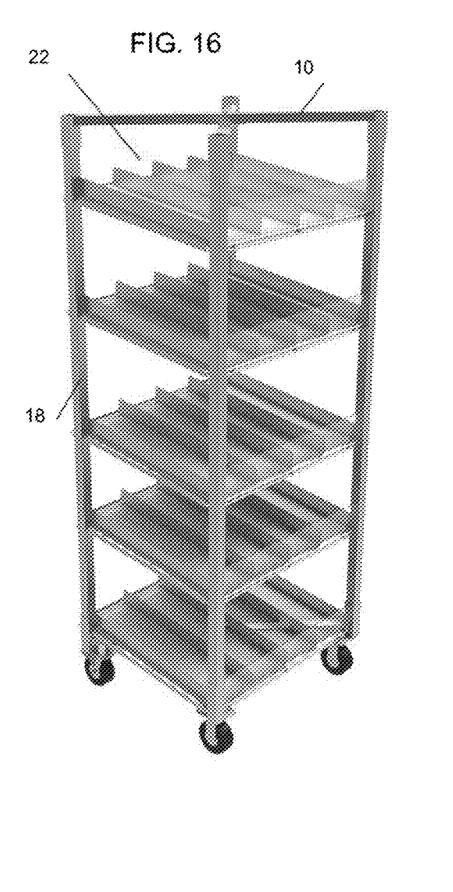

FIGS. 15 and 16 show oblique an individual product shelf support having casters 24 on a bottom thereof to enable movement. The casters 24 may include features to enable them to engage the support conduits (14 in FIG. 1) on the bottom of the product support shelf. In a multiple unit system as shown in FIGS. 15 and 16, the casters 24 may engage both the support conduits and the vertical support columns at the bottom ends thereof to make the entire display system movable on the casters 24. The embodiment of FIGS. 15 and 16 may use only one end support frame 10 (as explained with reference to FIGS. 1-5) on an upper end of the vertical support columns 18. The embodiment of FIGS. 15 and 16 may also use an end support frame 10 as explained with reference to FIGS. 1-5 on the bottom end of the support columns 18. The shelves 22 may be connected to the vertical support columns 18 to maintain their relative positioning along the length thereof.

Thus, a modular shelf support system may include individual product shelf supports as shown in FIGS. 15 and 16, or may include a plurality of interconnected product shelf supports as shown in FIGS. 13 and 14.

Figure 17:
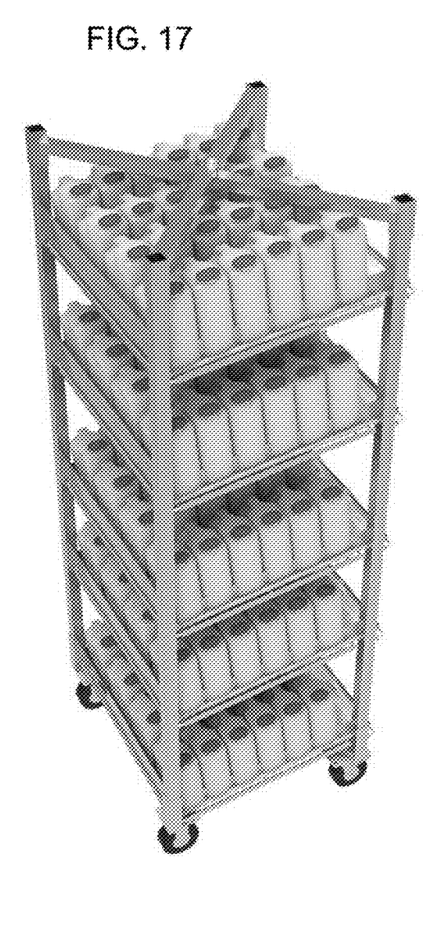
FIGS. 17 and 18 show the product shelves of FIGS. 15 and 16 with product containers thereon.
Figure 18:
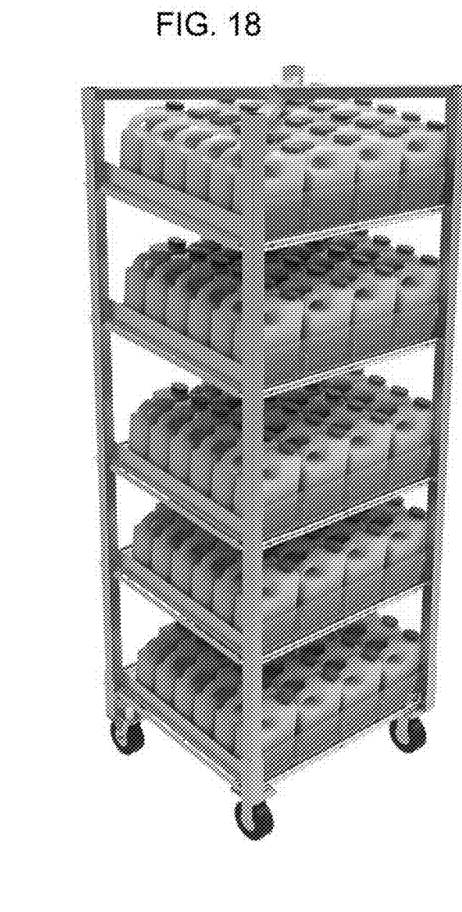

FIGS. 17 and 18 show the product shelves of FIGS. 15 and 16 with product containers thereon.

Figure 19:
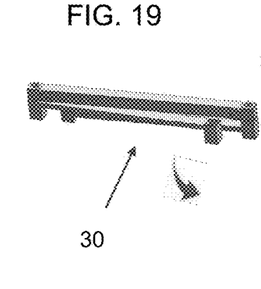
FIGS. 19-21 show an example embodiment of an upper end frame usable in some embodiments of a display shelf support frame.
Figure 20:
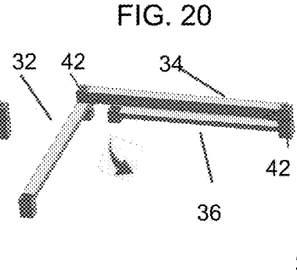
Figure 21:
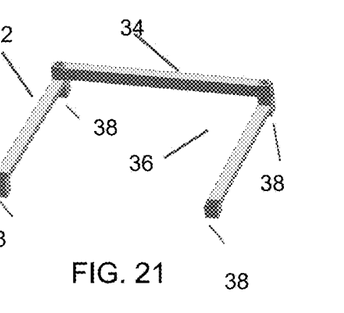

FIGS. 19-21 show various views of an example embodiment of an upper end frame that may be used in some embodiments. FIG. 19 shows the upper end frame 30 in a closed position such as may be used for transportation. FIG. 20 shows the upper end frame 30 partially opened. The upper end frame 30 may comprise a first side rod 32, an end rod 34 and a second side rod 36. One end of each side rod 32, 36 may be pivotally coupled to the end rod 34 using a pivot or swivel 42 at each respective connection. The side rods 32, 36 and the end rod may be any suitable cross sectional shape, including without limitation rectangular, square and round.

FIG. 21 shows the upper end frame 30 fully opened. The free longitudinal ends of each of the side rods 32, 36 may include a support conduit 38. Similarly, the pivots (42 in FIG. 20) may each include a respective support conduit 38. The support conduits 38 may be generally perpendicular to the length of the rods 32, 34, 36 and may be shaped to engage the upper ends of the support columns (e.g., 18 in FIG. 7).

Figure 22:
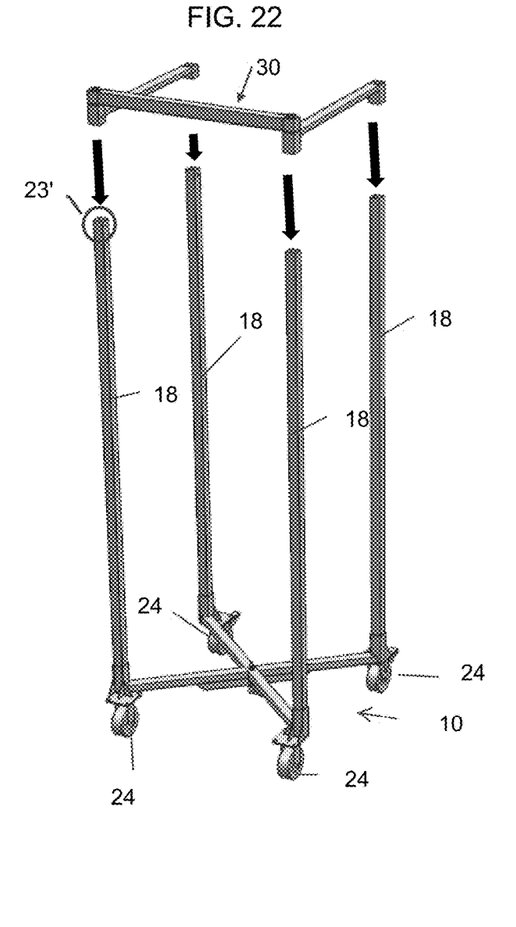
FIG. 22 shows assembly of the upper end frame of FIGS. 19-21 to vertical support columns on a display shelf support frame.

FIG. 22 shows an example display shelf support using an upper end frame as described with reference to FIGS. 19-21. The display shelf support may include an end frame 10 as described with reference to FIGS. 1-3 and support columns 18 inserted into the support conduits on the end frame 10. An upper end frame 30 as explained with reference to FIGS. 19-21 may be opened and then inserted into or onto (depending on the relative sizes of the support conduits and support columns) the upper ends of the support columns 18 to form a complete display shelf support. In the example embodiment of FIG. 22, the lower end frame may have casters 24 inserted into the support conduits. In other embodiments the casters may be omitted.

Figure 23:
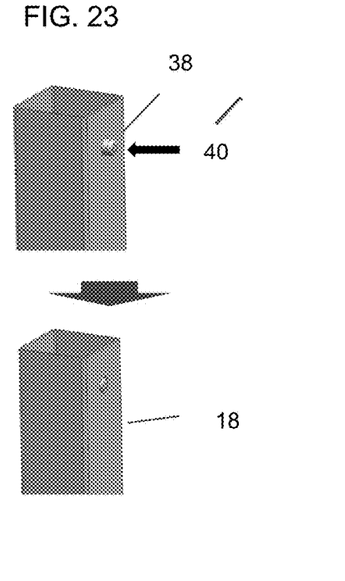
FIG. 23 shows a detailed view of connection between a vertical support column and a support conduit on an upper end frame.

FIG. 23 shows a connection between a support column 18 and the support conduit 38 on the upper end frame. After assembly of the support conduit 38 to the support column 18, the foregoing two components may be held together with a locking pin 40 or any similar device.

Figure 24:
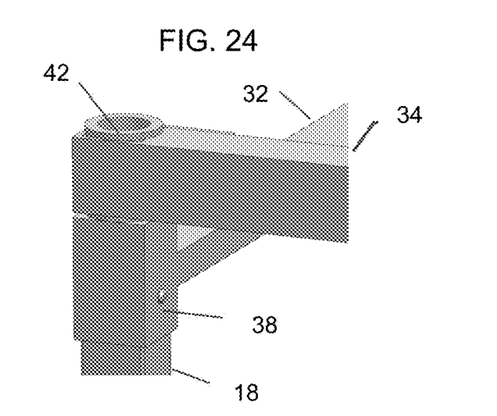
FIG. 24 shows a detailed view of a pivot used in the example end support frame of FIGS. 19-21.

FIG. 24 shows a detailed view of the pivot 42 that may be used to couple the side rod (either 32 or 36 in FIG. 20, wherein rod 32 is shown in FIG. 24) to the end rod 34. FIG. 24 also shows a detailed view of the support conduit 38 coupled to the longitudinal end of the side rod 32. FIG. 24 also shows the support conduit 38 assembled to the upper end of one of the support columns 18.

Figure 25:
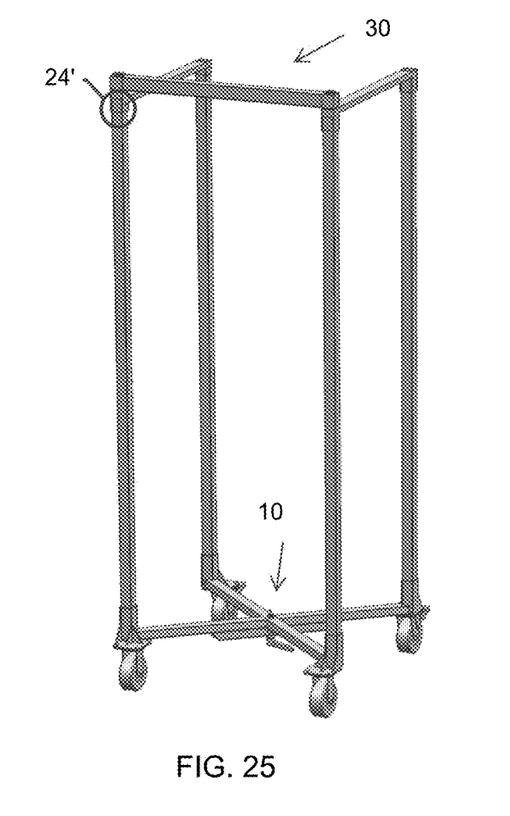
FIGS. 25 and 26 show perspective views of an assembled shelf support frame using the example embodiment of upper end frame of FIGS. 19-21.
Figure 26:
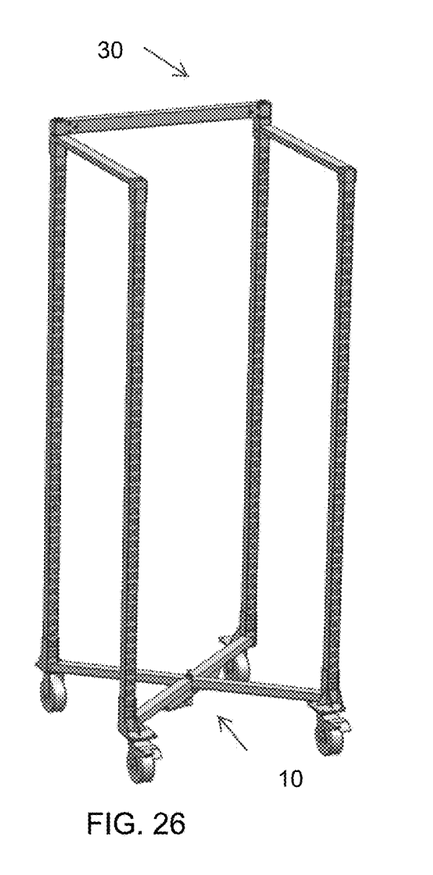

FIGS. 25 and 26 show two opposed oblique views of an assembled display shelf using an upper end frame as explained with reference to FIGS. 19-21.

A modular product display shelf system as disclosed herein may enable the user to assemble a number of different configurations of product display shelf while minimizing the space needed to transport components of such a shelf system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A modular product display shelf system, comprising:
at least a first end support frame comprising two rods pivotally connected to each other, each of the two rods having support conduits affixed at longitudinal ends thereof in a direction transverse to a longitudinal dimension of the rods;
vertical support column disposed in each support conduit at one longitudinal end of each vertical support column;
at least one shelf affixed at a selected longitudinal position along and to each of the vertical support columns;
at least a second end frame coupled to opposite longitudinal ends of the vertical support columns, the at least a second end frame comprising two side rods each pivotally coupled at one longitudinal end thereof to a respective longitudinal end of an end rod such that when the side rods are rotated to an open position the at least a second end frame is substantially U shaped, each of the two side rods and the end rod having support conduits at each respective longitudinal end; and wherein the two rods of the at least a first end support frame are pivotally connected to each other at respective longitudinal centers thereof.

2. The system of claim 1 wherein the at least a first end support frame pivot is lockable to retain the at least two pivotally connected rods in an open position for use with the vertical support columns and the at least one shelf, and in a closed position for transportation.

3. The system of claim 1 further comprising casters affixed to a lower end of the vertical support columns.

4. The system of claim 3 wherein the casters are affixed to a lower end of each of the support conduits.

5. The system of claim 1 wherein a cross section of the rods is at least one of tubular, angled, rectangular and square.

6. The system of claim 1 wherein the rods are the same length.

7. A method for assembling a modular product support shelf, comprising:

opening, from a closed position, at least a first end support frame comprising two pivotally connected rods each having support conduits at longitudinal ends thereof by rotating the rods with respect to each other, wherein the two rods of the at least a first end support frame are pivotally connected to each other at respective longitudinal centers thereof, the support conduits affixed to the longitudinal ends of the pivotally connected rods in a direction transverse to a longitudinal dimension of each of the two pivotally connected rods;

inserting one longitudinal end of a support column in each of the support conduits; and attaching to the other longitudinal end of the each of the support columns a second end frame after opening thereof from a closed position, the second end frame comprising two side rods each pivotally coupled at one longitudinal end thereof to a respective longitudinal end of an end rod, such that when the side rods are rotated to an open position the at least a second end frame is substantially U shaped, each of the two side rods and the end rod having support conduits at each respective longitudinal end.

8. The method of claim 7 wherein the opening the first end support frame comprises releasing a locking mechanism prior to rotating the rods and locking the locking mechanism when the rods are in an open position.

9. The method of claim 8 wherein the rods of the first end support frame are substantially orthogonal to each other when in the open position.

10. The method of claim 7 further comprising affixing at least one product shelf to the support columns at a selected longitudinal position along the support columns.

11. The method of claim 7 further comprising opening at least a third end frame from a closed position, the third end frame having a structure substantially the same as the first end frame, inserting support columns into support conduits at longitudinal ends of rods on the third support frame and inserting upper ends two of the support columns into support conduits on longitudinal ends of rods on the second support frame.

12. The method of claim 7 further comprising inserting a locking pin in each connection between the end frame and a respective support column, wherein the side rods further comprise support conduits at their respective longitudinal ends, the support conduits on each side rod shaped to engage an upper end of a respective support column.

* * * * *